Sept. 10, 1963 W. H. LAMAN ET AL 3,103,656

PAPER TAPE MOVEMENT DETECTION DEVICE

Filed Dec. 30, 1957 4 Sheets-Sheet 1

A PORTION OF A CORRECT UNIT RECORD OF TAPE.

INVENTORS
WILLIAM H. LAMAN
JOHN B. NORRIS

BY Sughrue & Rothwell

ATTORNEYS

Sept. 10, 1963 W. H. LAMAN ET AL 3,103,656

PAPER TAPE MOVEMENT DETECTION DEVICE

Filed Dec. 30, 1957 4 Sheets-Sheet 2

INVENTORS
WILLIAM H. LAMAN
JOHN B. NORRIS

BY Sughrue & Rothwell
ATTORNEYS

PAPER TAPE MOVEMENT DETECTION DEVICE

Filed Dec. 30, 1957

4 Sheets-Sheet 3

INVENTORS
WILLIAM H. LAMAN
JOHN B. NORRIS

BY Sughrue & Rothwell
ATTORNEYS

Sept. 10, 1963 W. H. LAMAN ET AL 3,103,656

PAPER TAPE MOVEMENT DETECTION DEVICE

Filed Dec. 30, 1957 4 Sheets-Sheet 4

INVENTORS
WILLIAM H. LAMAN
JOHN B. NORRIS
BY Sughrue & Rothwell
ATTORNEYS 3,103,656

PAPER TAPE MOVEMENT DETECTION DEVICE

William H. Laman, Wappinger Falls, and John B. Norris, Hyde Park, N.Y., assignors to International Business Machines Corporation, New York, N.Y., a corporation of New York Filed Dec. 30, 1957, Ser. No. 705,908
3 Claims. (Cl. 340—259)

This invention relates to movement detection devices for moving webs and the like, and more particularly to a paper tape advancement detection device for use with a paper tape utilized to store information in spaced columns upon the tape.

In information storage devices in general use today, one of the more common types makes use of a paper tape system to record the information in spaced uniform columns upon the tape as the tape is advanced through the apparatus. Of necessity, there must be a guarantee of highly accurate data formation, transmission and conversion. Incorporated in the present designs are checks to insure such accuracy. For instance, the present IBM paper tape systems employ a tape punch redundant check which comprises an electromechanical device for checking that and odd number of bits make up each code in each column of tape. In addition, such systems employ an arrangement whereby the number of bits of information in a unit record of tape are added to form a total and the total becomes a permanent part of the unit record so that when used throughout the system it guarantees tape accuracy as it progresses from station to station. Other checks may be employed; such as devices to eliminate unrecognized errors produced by the operator when punching the paper tape from an original document and systems which may be used to check that in any given field there is a definite number of columns of information. It is therefore quite apparent that the highly complex information storage machines in use today must include positive checks to insure the high accuracy required. However, the aforementioned checks are of little use if the paper tape is not being properly fed through the machine.

The present invention relates to improved means for checking that the paper tape moves one column for each separate code punched in the tape during each and every punching cycle. Since different information may be punched in each column of tape as it moves through the machine, any intermittent failure to advance one column of tape can cause incorrect information to be formulated, since information which should be located in the next adjacent column would be superimposed upon the first column should the tape fail to move a space of one column during the intermittent failure. Errors of this type will not be detected by the first three mentioned checks above. The error caused by failure of intermittent feeding will result in a reduction in the number of total columns to be punched. The fourth mentioned check, that is, the system which is used to check that in any given field there is definite number of columns of information, will recognize the lack of one column of informaion and will notify the operator of such error. However, erors discovered in this manner necessitate reprocessing of the unit record in question from the originating point of the error. Such a procedure is costly and time consuming and, in addition, it is quite difficult for the personnel to analyze and correct this particular trouble. In addition to intermittent failure, the paper tape may fail to move due to tape feed holes being torn out by the pinwheel in the punching unit. In such an instance, the paper tape will stop at the point where the tape feed holes are torn and no further movement of the tape will occur.

It is therefore an object of this invention to provide an improved paper tape movement detection device which will detect intermittent failures as well as a continued failure of the tape to move through the device.

A further object of this invention is to provide an improved paper tape movement detection device in which informaiton is recorded in spaced uniform columns on the tape, and in which the failure of the tape to move a distance of one column space will result in instantaneous and positive stoppage of the paper drive means.

In accordance with one form of this invention, there is provided an apparatus for detecting failure of tape advancement which includes tape advancement sensing means, a normally open circuited current path in which the current path includes at least one first cyclically operated switch which opens and closes in accordance with a first operating program, and at least one second cyclically operated switch which opens and closes in accordance with the first operating program and a second operating program determined by the tape advancement sensing means whereby the first and second programs are synchronized by tape advancement to prevent the closing of the normally open circuited current path and upon such closing of the current path, by failure of synchronization between the two programs, there is actuated means to detect the failure of tape advancement.

For a better understanding of this invention, reference may be had to the accompanying drawings.

Figure 1:
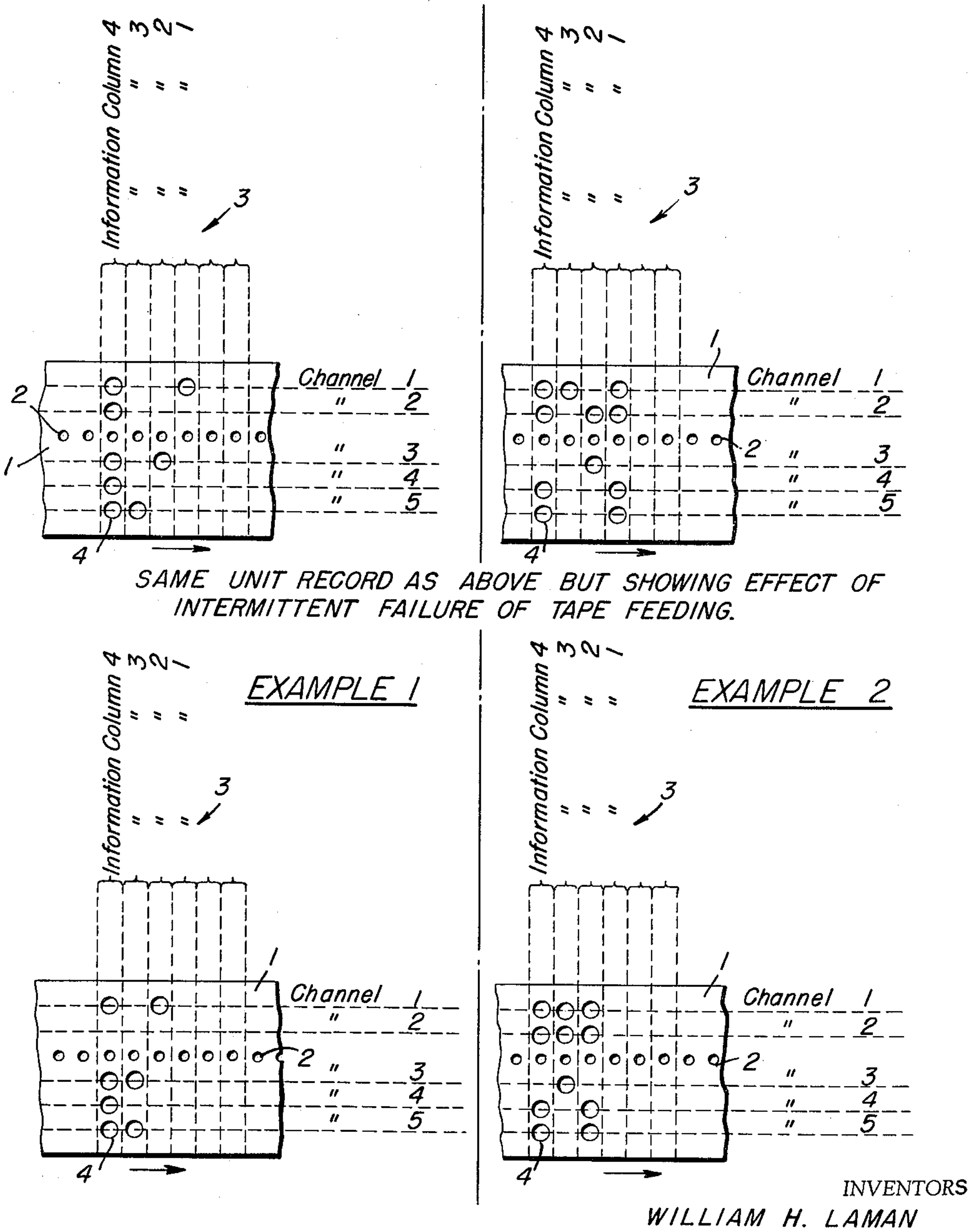
FIGURE 1 is a view showing representative sections of paper tape used to record information in spaced columns employed in one embodiment of this invention, the representative sections showing portions of tape wherein the information is correctly recorded and portions wherein the information is incorrectly recorded.

Referring now to FIGURE 1 of the drawings, there is shown four separate representative sections of paper tape of the type utilized in machines employing the paper tape advancement detection device forming the present invention. To understand the need for a detection device which will operate instantaneously to shut down the machine in case of feed failure, it is important to understand the effect of failure of the tape to advance properly in connection with the storage information upon the tape. The four sections of paper tape 1 include a series of spaced holes or apertures 2 which are formed on a line running longitudinally of the tape. These apertures or holes are provided to receive the projecting teeth of a conventional paper tape driving wheel so as to advance the tape in response to movement of the driving wheel. In addition, the tape is divided into a series of discrete uniform areas or columns 3 running transversely of the tape, each area or column being adapted to contain certain information placed upon the tape during an information period. A first series of dotted lines runs transversely across the paper and indicates the discrete uniform information areas or columns 3 adapted to carry in each area any one or combinations of the spaced holes 4 as indicia of the information. The tape is advanced in a step-wise fashion, remaining stationary for a time necessary to record by punching the information in the information areas or columns. The recording time for any one information column may be called the information period. As the paper tape 1 is advanced through the apparatus a distance of one of the discrete uniform information columns or areas, information is transferred to the moving tape by punching the spaced holes 4 within the information column 3. In order to produce accurate recording, the holes 4 are punched along five longitudinally extending channels as indicated by the second series of longitudinally extending dotted lines designating channels 1 through 5 reading from top to bottom.

As indicated by the arrows, the representative sections of the paper tape are moving in a direction from left to right. For example, in the section shown in the upper left-hand corner of FIGURE 1, during the first information recording period, a hole 4 is punched along channel 1 within information column 1 and during the next information recording period, the paper tape has advanced a distance determined by the width of one of the discrete uniform information areas or columns and a hole 4 is punched along channel 3 and within column 2. Likewise, in the information period, a hole 4 is punched along channel No. 5 within the third information column. When translated into telegraphic code, the first hole within information column 3 would be read as an "E," the information within the second column as designated by the hole line in channel 3 would be read as a "space" and the single hole lying along channel 5 in the third information column would be read as a "T." In information column 4, there is recorded "letters."

Should the tape fail to move during one information period, the result would be as indicated in the section shown in the lower left-hand corner. In this case, during the first information period, a single hole 4 was punched along channel 1 in information column 1 in the same manner as shown in the upper left-hand corner. However, an intermittent tape advancement feed failure occurred during the next two information periods and two periods were completed during which the tape failed to move each time a distance of one of the information columns so that the information to be punched during the third information period was superimposed upon the information recorded during the second information period. The result of this is that in column No. 2 there appears holes along channel No. 3 and channel No. 5. This information when translated into telegraphic code would indicate an "H" and as such, would be an error, and the "H" would be used as valid information in the accounting system unless detected by some means. The card column check noted previously would indicate the existence of an error but there would be no indication of which column contained the error.

The second example also shows the effect of an intermittent failure of tape feeding wherein information to be recorded during two separate information periods is superimposed within the same information column or area by the failure of the tape to advance so as to record erroneous information. As indicated in the upper right-hand corner of FIG. 1, during the second information period holes 4 are punched along channels 2 and 3 within information column 2, while a single hole 4 is spaced along channel No. 1 within information column 3, indicating a correct unit record of tape. In the example shown in the lower right-hand corner, the information to be recorded during the second and third information periods was superimposed within the second information column so as to indicate holes within column 2 spaced along channels 1, 2, and 3. When translated into telegraphic code, the example in the upper right-hand corner would indicate a numeral "8" within information column 2 and a numeral "3" within information column 3, whereas in the incorrect section shown in the lower right-hand corner the information erroneously recorded within information column 2 indicates the numeral "7." This error if not recognized would be used as valid information in the same manner as the letters might be used in Example 1.

Thus, these examples show a definite need for a paper tape movement detection device which will note an error occurring during the space of but a single information period, since even an intermittent failure of such short duration would result in the recording of spurious and invalid information which might not later be recognized.

Figure 2:
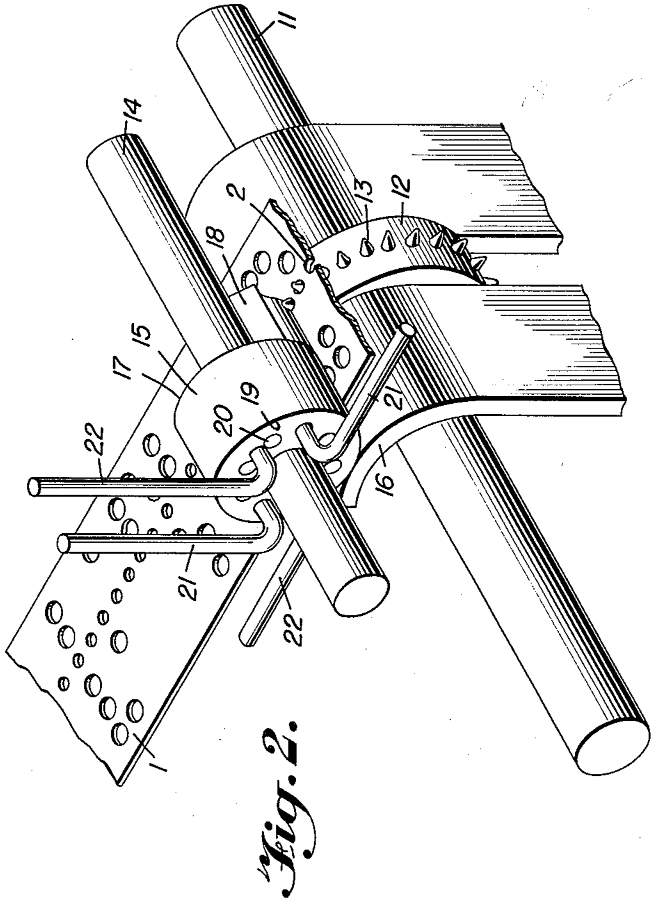
FIGURE 2 is a perspective view of one embodiment of this invention showing the tape drive and emitter structure.

A paper tape advancement detection device which will indicate such an error forms the present invention and is shown in one embodiment in FIGURE 2. Referring to FIGURE 2 of the drawing, there is shown a paper tape 1 which is identical to the sections of paper tape shown in FIGURE 1. In order to move the paper tape at a predetermined speed in a conventional manner, there is provided a paper tape drive shaft 11 upon which is fixed a paper tape drive wheel 12 adapted to rotate around the axis of the drive shaft 11. In order to positively drive the paper tape 10, there is provided upon the periphery of the paper tape drive wheel 12 a series of projections or pins 13, the pins being provided to engage the paper tape through the series of longitudinally extending holes 2 located on the paper tape. Thus, as long as the paper tape drive shaft 11 is rotating, and the projecting pins 13 are engaged in the holes 2 of the paper tape, there will be a continual step-wise advancement of the paper tape through the machine. This advancement will cease only if the driving means fails, the paper tape is broken at any point, or where the holes 2 are ripped so as to prevent proper engagement by the pins or projections 13 within the holes.

In order to detect failure of movement of the paper tape as it advances through the machine, there is provided a freely rotatable emitter shaft 14 which is positioned generally parallel to the paper drive shaft 11. A generally cylindrical emitter 15 constructed of insulating material is positioned upon the freely rotating shaft 14 so that the periphery of the cylindrical emitter is in contact with the surface of paper tape as it moves through the machine. As such, the emitter and the freely rotating shaft 14 are frictionally driven by the paper tape as it moves through the machine. It is important to note that emitter 15 rests on a stationary plate 16 when there is no tape present; hence, rotative motion of the emitter is dependent upon the continued movement of the paper tape through the machine.

In order to synchronize the movement of the emitter with respect to the moving tape there is provided at one end 17 of the cylindrical emitter 15 an extended portion or segment 18 which projects in an axial direction away from the emitter. The extended portion 18 is allowed to come in direct contact with any one of the moving pins 13 of the paper tape drive wheel 12 once per complete revolution of the emitter 18. While there may be a small amount of slippage between the positively driven paper tape and the frictionally driven emitter 15 during operation of the device, such lack of synchronism caused by the slippage will be intermittently eliminated by the positive engagement of the extended portion 18 and its respective drive wheel pin 13. The need for such synchronization will become more apparent as the cooperation between the emitter and an electrical circuit to detect failure of paper tape movement is indicated in the subsequent discussion of the operation of the electrical circuit.

The term "emitter" as used in the specification and in the claims is meant to define any type of electrical commutator which is operated by means of a moving tape to alternately open and close an electrical circuit in a manner normally found in conventional commutator construction. The specific emitter 15, shown in FIGURE 2, includes at the end 19 opposite to that containing the extended portion 18 a series of radially spaced electrical contacts 20 embedded therein. The contacts 20 on the emitter are equi-spaced along the edge 19 a distance related to the distance between punched columns 3 in the tape 1. The contacts 20 are connected or shorted by means of electrical conducting members (not shown) extending within the cylindrical insulating body of the emitter 15 so as to form a series of sets of conducting paths, whose contact portions 20 are spaced 180° away from each other so that each set of contacts has its face portions lying in a plane which extends through the axis of the emitter. In order to couple the emitter 15 with an appropriate electrical circuit to detect lack of movement of the tape, there is provided two sets or pairs of cooperating stationary contact brushes or wipers 21 and 22 which are positioned in proximity to the rotating emitter, and have end portions which are positioned flush against the edge 19 of the cylindrical emitter 15 and lie in the path of the sets of moving contacts 20. Thus, as the emitter 15 rotates around the axis 14 of the emitter shaft, the sets of rotary contacts 20 alternatively contact the stationary contacts or brushes 21 and 22 so as to complete the appropriate electrical circuit, as hereinafter described.

While the embodiment shown in FIGURE 2 shows a rotary emitter comprising a plurality of spaced sets of contacts and in cooperation with two sets of spaced stationary brushes or contacts, any appropriate design could be utilized, and the scope of this invention is not necessarily limited to the apparatus shown in FIGURE 2. In fact, the essential elements for such an emitter as utilized with the particular circuit employed in our invention, would consist only in providing one moving continuously energized contact which alternately makes contact with first one of the stationary contacts and then another of the stationary contacts, so as to energize either one or the other of two electrical circuits.

Briefly, the paper tape movement detection device shown in FIGURE 2 operates as follows: Driving means (not shown) provides a relatively constant step-wise rotation of paper tape drive shaft 11 which positively drives the paper tape drive wheel 12, moving the paper tape across the periphery of the drive wheel 12 through the positive engagement of the projecting pins 13 with the aligned holes 2 within the paper tape 1. Movement of the paper tape, therefore, in either direction will cause a like rotary movement of the cylindrical emitter 15 due to the frictional engagement of the emitter with the surface of the paper tape. For any movement of the paper tape there is corresponding movement of the emitter around its axis, and during such rotary movement, the sets of spaced shorted contacts 20 on the outer surface of one end of the emitter will therefore move from one set of spaced stationary contacts 21 to the other set of spaced contacts 22 whereby electrical current paths (hereinafter described) will be completed alternately between the two sets of spaced contacts according to a first predetermined operating program, the program being determined by the manner in which the paper tape moves through the apparatus. The emitter extended portion 18 cooperates with the pins 13 so as to synchronize the movement of the emitter with the paper tape in order that the emitter contacts 20 will effectively move from one set of stationary contacts to the other during a like movement of the paper tape a distance of one information column. Therefore, the use of the synchronizing element 18 in conjunction with the positive drive means 13 of the paper tape driving wheel, and the proportional spacing of the sets of rotary contacts 20 upon the end face of the cylindrical emitter 15 provides a mechanical arrangement whereby a particular electrical circuit will be completed each time the paper tape advances a space of one information column, and failure of the paper tape to advance for any reason results in a corresponding failure of the electrical circuit to be completed through the emitter.

Figure 3:
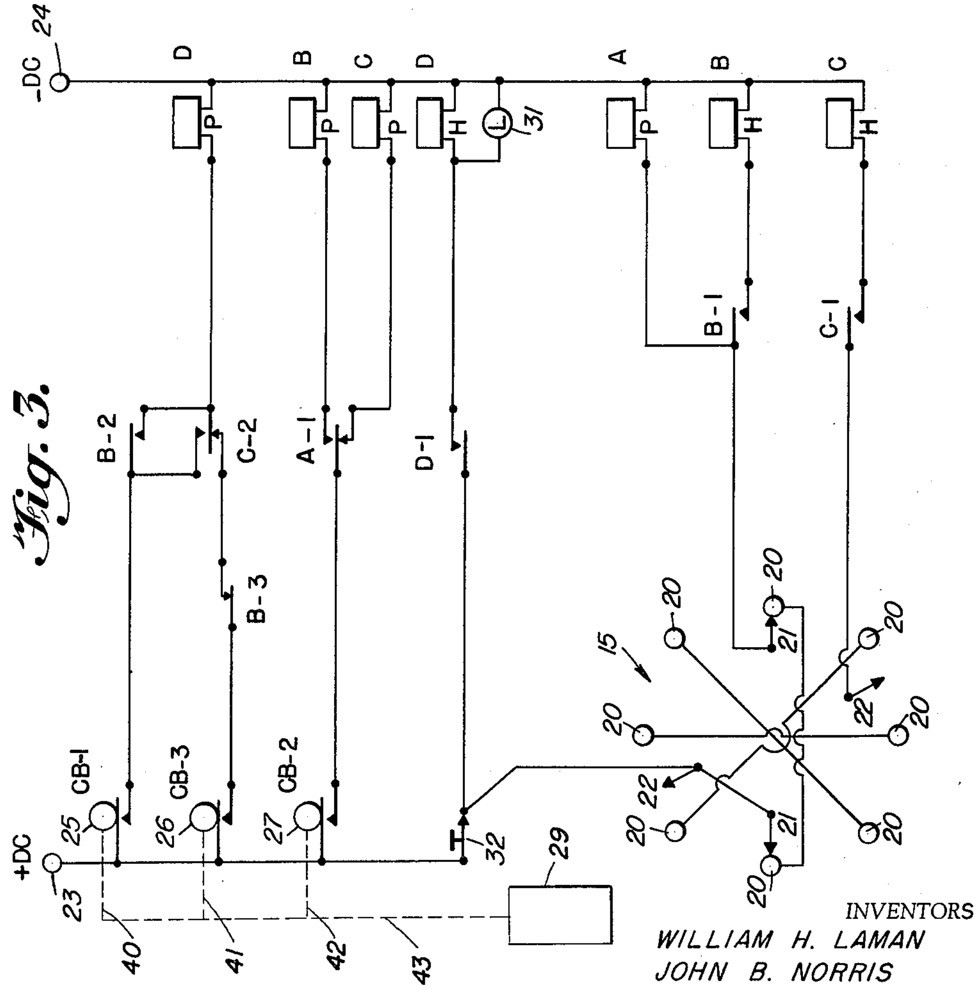
FIGURE 3 is a schematic drawing of the electrical circuit incorporating one embodiment of this invention.

In order to provide a detection system which will indicate a failure of the tape to move for any of the reasons before mentioned, and to further provide means for positively stopping the operation of the device, there is provided an electrical circuit shown in FIGURE 3 which operates in conjunction with the mechanical emitter shown in FIGURE 2.

Referring now to FIGURE 3, there is shown schematically, the emitter 15 which includes the plurality of short-circuited spaced sets of contacts 20 which cooperate with two sets of spaced stationary contacts or brushes 21 and 22 so that the shorted contacts 20 alternately move from one of the sets of stationary contacts to the other so as to alternately complete an appropriate electrical circuit.

As noted previously, the emitter operates under a definite program, wherein the moveable emitter contacts alternately close first one electrical circuit and then another electrical circuit, the schedule being determined by the rotation of the frictionally driven emitter as it is driven by the advancing tape.

The emitter operates in conjunction with an electrical circuit supplied by a direct current source (not shown) which is connected to the input leads 23 and 24. The electrical circuit incorporates a plurality of current paths including a plurality of positively operated switches CB–1, CB–2 and CB–3 having an opening and closing schedule determined by a program which remains relatively fixed. The program may be determined by any desired conventional means upon energization of the machine which utilizes the moving tape. In this embodiment, the positively operated switches may be operated in conjunction with the paper tape drive shaft. The dotted lines 40, 41 and 42 indicate a synchronized drive arrangement of conventional construction for sequentially opening and closing of the cam operated switches CB–1, CB–2 and CB–3 which may be driven by the tape drive mechanism 29, through mechanical coupling means 43. The switches CB–1, CB–2, and CB–3 have an opening and closing schedule whereby only one is closed at any particular time, and in which there is no overlapping of the closing schedules of any of the switches. Thus, the electrical circuit includes a first and second operating program, the first operating program being determined by the movement of the emitter and the second operating program determined by the positively driven cams 25, 26, and 27, as shown schematically in FIGURE 3.

Also incorporated in the electrical circuit are a number of electrical relay coils A, B, C, and D, each of the relay coils B, C, and D having both a hold and a pick portion, whereas the relay coil A has a pick portion only. The relay coils operate in response to both the first operating program determined by the movement of the cam operated switches and the second operating program determined by the movement of the rotatable emitter so as to open and close appropriate relay operated contacts within the electrical circuit to provide an electrical signal upon failure of the tape to advance in the prescribed manner.

Figure 7:
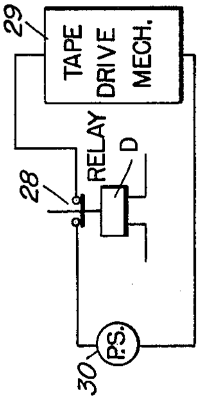
FIGURE 7 shows additional contacts of relay D of FIG. 3 in one circuit which when opened by the operation of relay D in the manner described in this specification will interrupt the power to the tape feed mechanisms.

In the circuit shown there are a number of parallel current paths wherein an electrical circuit may be completed between the direct current leads 23 and 24 through the cam operated switches, the relay coils and the relay coil operated switches. For instance, energization of relay coil A results in movement of the two position relay operated contact A–1 from a down position to an up position, and energization of the pick portion relay coil B operates to close normally open contacts B–1 and B–2 and open normally closed contact B–3. Energization of the pick portion of the relay coil C operates to move the two-position relay operated switch C–2 from the down position to an up position and to close the normally open contact C–1. It is important to note that the relay coils A, B, and C and switches controlled thereby operate under the influence of the first and second programs and are energized thereby in response to the completion of any one cycle of these programs during proper advancement of the tape through the machine. It is only upon the lack of synchronization between the first operating program and the second operating program that the pick coil of relay D operates. Thus, energization of the pick coil portion of the D relay operates as the detecting device in as far as failure of the tape to advance is concerned. During proper synchronization of the first operating program with the second operating program, the electrical path including the pick coil of relay D normally remains open and it is only upon lack of such synchronization that the electrical path is completed. The pick portion of relay coil D closes the normally open relay operated contact D–1 so as to energize the hold portion of coil D. While relay D is used only as a means to indicate the failure of the tape to advance correctly, it is contemplated that such a relay may be used with appropriate means to effectively stop the operation of the machine by cutting off the power to the tape drive means in any conventional manner. Such a manner is shown in FIGURE 7. The relay D controls switch 28 in the power supply circuit for the tape drive mechanism 29. Energization of relay D opens switch 28 to disconnect mechanism 29 from its power supply 30. This stops tape advancement.

Figures 4, 5, 6:
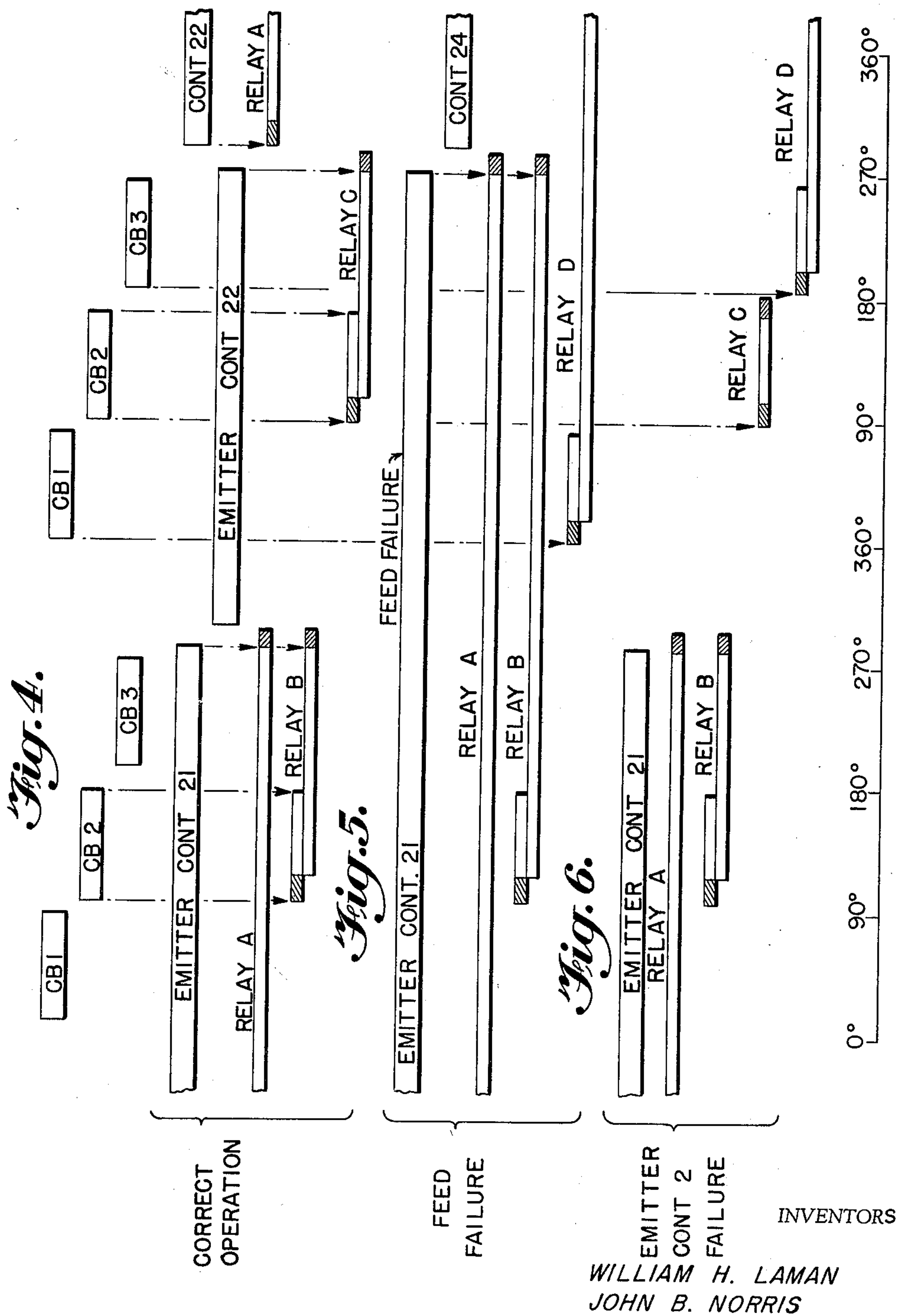
FIGURE 4 is a chart showing the opening and closing schedules of the cam operated switches, relay operated switches and the emitter contacts during the correct operation of the system.
FIGURE 5 is a chart showing the opening and closing schedules of the cam operated switches, relay operated switches and the emitter contacts during an operation of the system wherein feed failure of the tape occurs.
FIGURE 6 is a chart showing the opening and closing schedules of the cam operated switches, relay operated switches and the emitter contacts during operation of the system in which there is a failure of emitter to operate properly.

For a better understanding of this invention, and in order to effectively show the operation of the emitter and its associated electrical circuit, there is provided three charts as shown in FIGURES 4, 5, and 6 wherein the operation of the particular elements making up the electrical circuit such as the cam operated switches, the relay operated switches, and the alternative energization of the stationary contacts of the emitter are shown by the opening and closing schedules as indicated in the charts. All three of the charts are provided with an operating schedule as determined by the number of degrees of rotation of the shaft which drives the cam operated switches CB–1, CB–2, and CB–3. As shown, the cam operated switches will complete two cycles of operation, whereas the emitter will complete but a single cycle. In addition, the cam operated switches have a make and break schedule which precludes overlapping of operation of any of the cam operated switches as each individual switch is closed for only 80° of rotation of the cam drive shaft.

While the charts indicate a particular desired sequence of operation of the particular elements making up the electrical circuit, variations in the operating schedules of the particular elements are envisioned by the inventors, and the only criteria necessary to the operation of the device in a prescribed manner is that the first operating program and the second operating program be so synchronized that their combined operation results in the prevention of the completion of the normally open circuit which includes the relay coil D.

Referring now particularly to chart No. 4 which shows the correct operation of the tape movement detection device, there is arbitrarily shown an operating cycle which starts with the closing schedule of the cam operated switch CB–1. As indicated, the cam operated switch closes at 10° and opens at 90°. At 10° the cam operated switch CB–1 is closed and the emitter contacts 21 have been energized by the shorted rotary contacts 20 of the emitter 15 so as to provide an electrical circuit from direct current lead 23 to direct current lead 24 through the pick coil of relay A. Energization of the pick coil A causes the normally down, double-acting, relay operated switch contact A–1 to move upwards thereby tending to close a current path including the pick portion of relay coil B. However, since the cam operated switch CB–2 is open, there will be no energization of either relay coil B or C, thus effectively preventing a completion of the normally open circuit through the feed error relay coil B. At 100°, cam operated switch CB–2 now closes, and relay A is still energized since the circuit of emitter contacts 21 is still completed by the shorted rotary contacts 20. At this instant, since switch CB–2 has its contacts closed, and since the pick coil portion of relay A is energized, the movable contact of the two-position switch A–1 will move upwardly under the influence of coil A to provide an electrical circuit from lead 23 to lead 24 through the pick portion of relay coil B. Energization of the pick portion of the relay coil B causes the normally open switch B–1 to close, energizing the hold portion of the B relay coil. At the same time, the normally open contacts of switch B–2 close, which tends to close the normally open current path through the feed error relay coil D. However, both the cam operated switches CB–1 and CB–3 are at their open portion of the operating schedule and the normally open circuited current path to the feed error relay coil D will remain open. In order to completely understand the operation of the relays, the shaded portions of the operating programs shown in the charts indicate the time delay in operation of the pick coil in order to energize the hold coils of the appropriated relays. In addition, the double paths as indicated with respect to relays B, C, and D indicate the operation of both the hold and pick portions of the relay coils, with the upper portions of the path indicating the operation of the pick portion of the coil and the lower portion of the path indicates the operation of the hold portion of the relay coil.

Again referring to FIGURE 4, at 200°, switch CB–3 is operating at its closing portion of the operating program, and as indicated, the emitter contacts 21 still have their circuit completed and relay A is energized as well as the hold portion of relay B. The normally open circuited current path remains open, because the circuit cannot be completed through cam operated switch CB–1 since it is operating at its open portion of the operating program. While switch CB–3 is operating at its closed portion, the energization of the relay coil B opens the normally closed relay operated contact B–3 so as to prevent energization of the feed error relay D.

Upon the opening of the cam operated switch CB–3, relay coils A and B are de-energized and the electrical circuit completed between emitter contacts 21 ceases as the rotary short-circuited contacts 20 move from the one set of emitter contacts 21 to the other set of emitter contacts 22. This effectively completes one cycle of operation as determined by the rotation of the three cams operating the cam operated switches. The second cycle as determined by the rotation of these cam operated switches starts again at 10° wherein the cam operated switch CB–1 closes its contacts. Unlike the previous situation wherein the emitter contacts 21 were energized, which resulted in energizing relay coil A, none of the relay coils operate since there is no completion of any electrical current path throughout the system. At 100°, the cam operated switch CB–2 closes and an electrical circuit is completed between leads 23 and 24 through cam operated switch CB–2 and through the normally down contact of the two-position relay operated contact A–1 to energize the pick portion of relay coil C. Subsequently, the normally open relay operated coil C–1 is closed so as to energize the hold portion of the relay coil C through the emitter contacts 22. However, the normally open circuited current path through the feed error relay D remains open, since neither of the cam operated switches CB–1 or CB–3 are presently closed. At 200°, the cam operated switch CB–3 closes. Relay C remains energized through its hold coil and the energized emitter contacts 22. Again, the normally open circuited current path through the feed error relay coil D remains open since the relay coil C operates to move the normally down contact of the two-position relay operated switch C–2 to the up position, even though the cam operated switch CB–3 is closed at this instant. This completes the operation of one cycle of the tape movement detection system, and as indicated synchronization between the first operating program as determined by the cam operated switches, and the second operating program as determined by the moving emitter results in a failure to complete the normally open circuit which includes the feed error relay coil D.

Referring to FIGURE 5, there is shown a chart describing the effect of a feed failure of the tape. In the first portion of the operating program, the cam operated switches open and close according to their respective program and in synchronism with the movement of the emitter wherein the emitter contacts 21 are energized by the shorted set of emitter contacts 20. As indicated, the feed failure occurs prior to the end of the first full operating cycle of the cam operated switches. This feed failure may be the result of a broken tape, or the fact that the driving holes 2 within the tape may be ripped so as to prevent positive driving of the tape by the projecting pins 13 on the paper tape drive wheel 12, or may occur because of a failure of the emitter to be frictionally driven even though the tape continues to move. In any event, the emitter fails to rotate and the emitter contacts 21 remain energized even though a new cycle of operation of the cam operated switches is about to commence. As indicated by the chart, since the emitter contacts 21 are still shorted by the moving emitter contacts 20, the pick portion of relay coil A remains energized as does the hold portion of relay coil B and therefore both coils will remain in this condition as the cam operated switches start a new cycle. At 10°, in the new cycle, the cam operated switch CB–1 closes. Since the hold portion of relay coil B is energized, the normally open contact of relay operated switch B–2 will be closed, thus completing a circuit through the normally open circuited current path including cam operated switch CB–1, relay operated contact B–2, and the pick portion of the feed error relay coil D. As noted previously, the closing of this normally open circuited current path and subsequent energization of the feed error relay D indicates a malfunction of one of the three previously noted operating elements. Energization of the pick portion of the feed error relay coil D operates to close normally open relay operated contacts D–1 so as to energize the hold portion of the feed error relay coil D and energize an error lamp 31.

After the detection of the tape advancement failure, which may be utilized to shut down the operation of the machine, as shown in FIGURE 7 there is provided a reset button or switch 32 which is incorporated in one of the power supply lines as well as in the current path which includes the hold portion of the feed error relay coil D so as to place the tape advancement detection circuit in its initial operable status after the error produced by the failure of the tape to advance has been rectified.

FIGURE 6 is a chart showing the effect of a failure of the emitter to operate properly. An example of such a failure would be when the emitter continues to rotate, but one of the shorted sets of contacts on the moving emitter fails to complete a circuit between one of the cooperating sets of stationary contacts in the desired sequential operation. This may be caused by an open circuit between the two spaced moving emitter contacts. In this instance, the first portion of the operation is identical to that shown in FIGURES 4 and 5, and the malfunction of the emitter occurs subsequent to the de-energization of emitter contacts 21 and prior to the desired sequential energization of emitter contacts 22. Unlike the program as indicated in FIGURE 5, as soon as the emitter contacts 21 are de-energized and cam operated switch CB–3 moves to its open portion of the operating schedule, relay coil A and relay coil B are both de-energized. At the beginning of the next operating cycle as determined by the movement of the cam operated switches, the cam operated switch CB–1 closes. Since the emitter is now malfunctioning, neither its contacts 21 or 22 are closed so that none of the relays A, B, and C will be energized. Therefore, the normally open circuited current path through the pick portion of the feed error relay coil D will remain open since normally open contact B–2 remains open. At 100°, the cam operated switch CB–2 closes and since the two-position relay operated switch A–1 remains in the down position, and the cam operated switch CB–2 is closed, there will be a completed current path to the pick portion of relay coil C. The coil C will close normally open contacts C–1 but since neither emitter contact is closed, the hold portion of relay coil C will not be energized. Likewise the pick portion of the feed error relay coil D will not be energized since the cam operated switch CB–3 is open as well as the cam operated switch CB–1.

However at 200° the cam operated switch CB–3 now closes and relay coil C is no longer energized. Relay coil B will not be energized because of the failure of the emitter contacts 22 to be energized. There will be completed through the normally open circuited current path a closed circuit including cam operated switch CB–3, normally closed relay operated switch B–3, normally down, two-position relay operated switch C–2, and the pick portion of feed error relay coil D. Thus, because of a failure of the emitter to operate according to its defined program, there is a lack of synchronization between the program as defined by the cam operated switches and that defined by the emitter so as to produce an indication of a failure of the tape to advance or the malfunction of the emitter through the energization of the feed error relay D.

From the foregoing discussion, it is apparent that should either the positive tape-driving means, the moving tape or the frictionally driven tape movement detection means fail to operate in the prescribed manner, there will be produced a lack of synchronization between the cam operated switches and the frictionally driven emitter, this lack of synchronization causing the closing of the normally open circuited current path including relay D and the energization of relay D being an indication of a failure of any of the three means to operate in the prescribed manner.

While there is shown and described specific embodiments of the invention, there is no desire to be limited to any particular construction shown and described and it is intended by the appended claims to cover all modifications within the spirit and scope of the invention.

What is claimed is:

1. Apparatus for detecting failure of tape advancement comprising: tape advancement sensing means, a normally open circuited current path, means included within said current path to close said normally open circuited current path, said means including first cyclically operated switching means, said means further including second cyclically operated switching means, first operating program means, said first operating program means including means to cyclically operate said first cyclically operated switching means and to determine the opening and closing schedule thereof, second operating program means, said tape advancement sensing means including means to drive said second operating program means, said first and said second operating program means jointly including means to cyclically operate said second cyclically operated switching means and to jointly determine the opening and closing schedule thereof, means to synchronize the operation of the first operating program means with the second operating program means thereby synchronizing the operation of said first and second cyclically operated switching means so as to maintain said current path in said normally open circuited condition, and alarm means actuated upon closing of said current path to indicate lack of synchronization between said first and second operating program means to thereby indicate failure of tape advancement.

2. A tape monitoring apparatus for detecting failure of tape advancement comprising: tape advancement sensing means, said tape advancement sensing means further comprising a rotatable cylindrical roller mounted on an axis and made to turn by advancement of a tape being monitored, a normally open circuited current path, means included within said current path to close said normally open circuited current path, said means including first cyclically operated switching means, said means further including second cyclically operated switching means, first operating program means, said first operating program means including means to cyclically operate said first cyclically operated switching means and to determine the opening and closing schedule thereof, second operating program means, said rotatable cylindrical roller including at least one electrical contact, first and second stationary contacts positioned in the path of said electrical contact mounted on said rotatable cylindrical roller whereby said contact mounted on said rotatable cylindrical roller alternately contacts one and then the other of said stationary contacts, said stationary and movable contacts comprising said second operating program means, said first and said second operating program means jointly including means to cyclically operate said second cylically operated switching means and to jointly determine the opening and closing schedule thereof, means to synchronize the operation of the first operating program means with the second operating program means thereby synchronizing the operation of said first and second cyclically operated switching means so as to maintain said current path in said normally open circuited condition, and alarm means actuated upon closing of said current path to indicate lack of synchronization between said first and second operating program means to thereby indicate failure of tape advancement.

3. A tape monitoring apparatus for detecting failure of tape advancement comprising: tape advancement sensing means, said tape advancement sensing means further comprising a rotatable cylindrical roller mounted on an axis and made to turn by advancement of a tape being monitored, a normally open circuited current path, means included within said current path to close said normally open circuited current path, said means including first cyclically operated switching means, said first cyclically operated switching means including a plurality of cam actuated switches, said means further including second cyclically operated switching means, first operating program means, said first operating program means including means to cyclically operate said first cyclically operated switching means and to determine the opening and closing schedule thereof, second operating program means, said rotatable cylindrical roller including at least one electrical contact, first and second stationary contacts positioned in the path of said electrical contact mounted on said rotatable cylindrical roller whereby said contact mounted on said rotatable cylindrical roller alternately contacts one and then the other of said stationary contacts, said stationary and movable contacts comprising second operating program means, said first and said second operating program means jointly including means to cyclically operate said second cyclically operated switching means and to jointly determine the opening and closing schedule thereof, means to synchronize the operation of the first operating program means with the second operating program means thereby synchronizing the operation of said first and second cyclically operated switching means so as to maintain said current path in said normally open circuited condition, and alarm means actuated upon closing of said current path to indicate lack of synchronization between said first and second operating program means to thereby indicate failure of tape advancement.

References Cited in the file of this patent

UNITED STATES PATENTS

| | | |
|---|---|---|
| 2,142,880 | Anderson | Jan. 3, 1939 |
| 2,351,229 | Potts | June 13, 1944 |
| 2,547,525 | Hague | Apr. 3, 1951 |
| 2,770,675 | Johnston | Nov. 13, 1956 |
| 2,836,653 | Kolpek | May 27, 1958 |
| 2,972,678 | Anton | Feb. 21, 1961 |